United States Patent [19]
Kobylarz et al.

[11] 3,953,887
[45] Apr. 27, 1976

[54] SPRING DRIVEN VELOCITY CONTROLLED MAGNETIC STRIPE READER

[75] Inventors: Lawrence P. Kobylarz, Howell; Ronald H. Mack, Plymouth, both of Mich.

[73] Assignee: Burroughs Corporation, Detroit, Mich.

[22] Filed: Nov. 15, 1974

[21] Appl. No.: 524,082

[52] U.S. Cl. ............................ 360/2; 235/61.11 D
[51] Int. Cl.² ..................... G11B 25/04; G06K 7/08
[58] Field of Search ................. 360/2; 235/61.11 D, 235/61.7 B, 61.11 R; 35/35 C

[56] References Cited
UNITED STATES PATENTS

| | | | |
|---|---|---|---|
| 3,472,970 | 10/1969 | Basseches | 35/35 C |
| 3,488,867 | 1/1970 | Lyon et al. | 360/2 |
| 3,671,717 | 6/1972 | Bieser | 235/61.7 B |
| 3,780,264 | 12/1973 | Kondur, Jr. et al. | 235/61.11 D |

*Primary Examiner*—James W. Moffitt
*Attorney, Agent, or Firm*—Edwin W. Uren; Paul W. Fish

[57] ABSTRACT

A low cost credit card reader is provided wherein the magnetic stripe on a stationarily positioned credit card is read by the spring powered transverse activation of a read head, and wherein the normal spring-related fluctuations in read head velocity are compensated for and offset by a rotatable member having a concentric circumference and a variably radiused spiraling circumference, the rotatable member being interposed between and cable interconnected with said spring and a translatable read head carrier, said spring and said rotatable member in association with an opposing airpot cooperating to provide the read head with a uniform controlled velocity of movement throughout each reading cycle.

12 Claims, 4 Drawing Figures

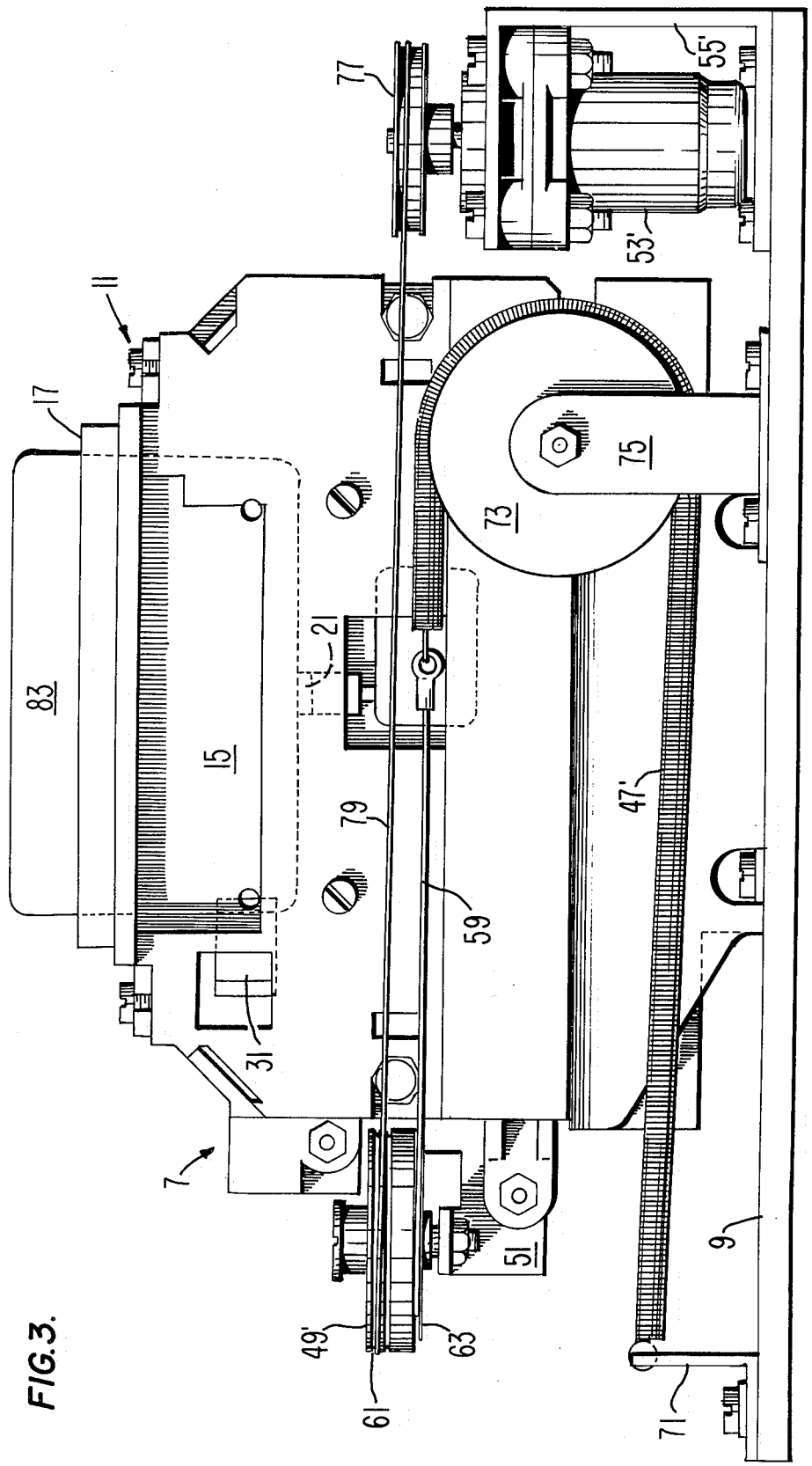

SPRING DRIVEN VELOCITY CONTROLLED MAGNETIC STRIPE READER

BACKGROUND OF THE INVENTION

Input and output terminal units for data processing systems have commonly provided magnetic stripe credit card readers for inputting customer account data into the system, such readers having been characterized by a variety of means and structures for either transversely activating a read head relative to a stationarily positioned credit card, or for transversely activating the credit card and the magnetic stripe thereof relative to a stationarily positioned read head. Regardless of whether the card is transversely activated relative to the read head, or the head relative to the magnetic stripe, these credit card readers have most generally provided cumbersome and relatively expensive means for controlling the velocity of the moving member's transverse motion, the latter being a requirement for the accurate and reliable reading and inputting of the recorded data. Although known structures for transversely activating the read head relative to the card have tended to be less expensive to manufacture than known structures for activating the credit card and magnetic stripe relative to the head, these structures have generally required the use of a servo motor in association with control circuitry to assure a constant and uniform velocity of movement of the read head relative to the magnetic stripe. Early attempts at a further reduction in the manufacturing costs of magnetic stripe readers, by eliminating the servo motor and the associated control circuitry, involved the employment of various spring drives as a means of transversely activating the head relative to the stripe. In these earlier spring powered readers, the read head carrier would be manually activated in a first direction to expand a drive spring and to set the head in its read-start position, whereupon the drive spring would activate the carrier in a second direction as the read head traverses the magnetic stripe and readably inputs the data recorded thereon. These spring drives however, by reason of the reducing pulling force of their contracting springs, were found to produce undesirable fluctuations in the velocity of travel of the read head relative to the magnetic stripe, the required constant and uniform velocity of travel of the read head accordingly not having been achieved thereby.

SUMMARY OF THE INVENTION

It is accordingly an object of the present invention to provide less expensive and yet reliable means for reading data recorded on the magnetic stripes of credit cards, such that the recorded information may be accurately read and inputted into a data processing system.

It is another object of the present invention to provide less expensive means for transversely activating a read head relative to the magnetic stripe on a stationarily positioned credit card, and wherein the customary servo motor and control circuitry may be eliminated.

It is still another object of the present invention to provide spring powered means for activating a read head relative to a stationarily positioned credit card, and wherein the normal fluctuations in spring rate are compensated for and offset by inexpensive control means interposed between the drive spring and the read head carrier.

An important aspect of the present invention is the provision in a spring powered magnetic stripe credit card reader of a rotatable member having a concentric circumference and an adjacent spiraling circumference, the rotatable member being angularly interposed between and interconnected with a drive spring and a read head carrier, a first flexible cable being utilized to connect the drive spring with the spiraling circumference of the rotatable member at its point of maximum radius, and a second flexible cable being utilized to interconnect the read head carrier and the concentric circumference of the rotatable member.

Another aspect of the present invention is the use of an airpot for applying a constant drag to the transverse movement of a read head relative to the magnetic stripe on a credit card in a spring powered credit card reader, such airpot cooperating with the rotatable member in compensating for and offsetting the normal fluctuations in the rate of contraction of the drive spring as the read head is transversely activated relative to the magnetic stripe.

BRIEF DESCRIPTION OF THE DRAWING

These and other objects and advantages of the invention will become apparent from the following description when read in conjunction with the accompanying drawing figures, in which:

FIG. 3 is a rear elevational view of the FIG. 2 embodiment showing the angular connection of the drive spring to the spiraling circumference of the rotatable member and showing also the cable connection between the rotatable member and the rotary airpot; and FIG. 4 is an exploded view of the rotatable member of the FIG. 2 embodiment showing the concentric and spiraling circumferences thereof and the manner of anchoring a pair of flexible cables thereto.

DESCRIPTION OF THE PREFERRED EMBODIMENTS

Figure 1:
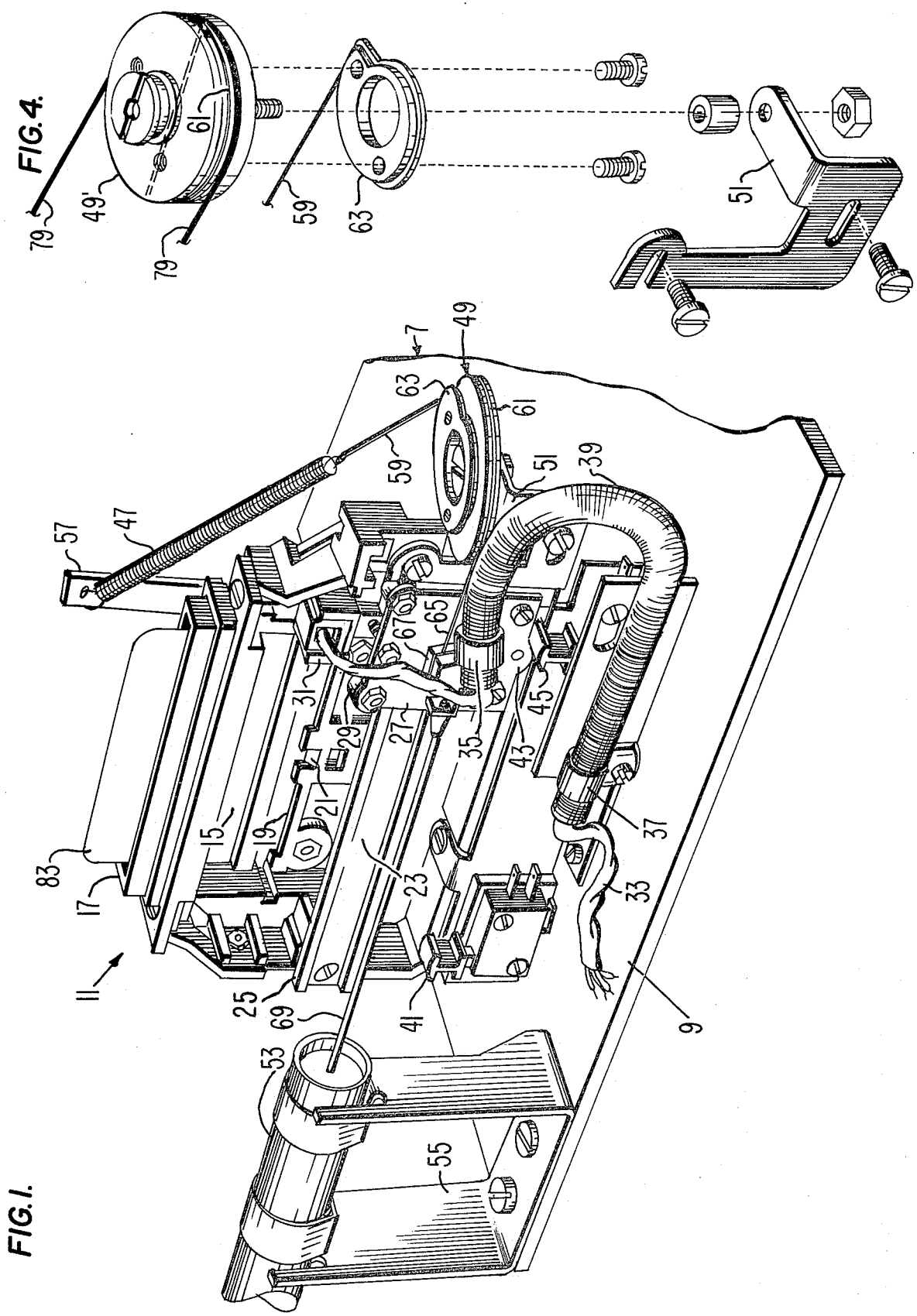
FIG. 1 is an elevational perspective view of one embodiment of the invention wherein a linear airpot is used and the drive spring is linearly connected to the frame structure and to the spiraling circumference of the rotatable member.
Figure 2:
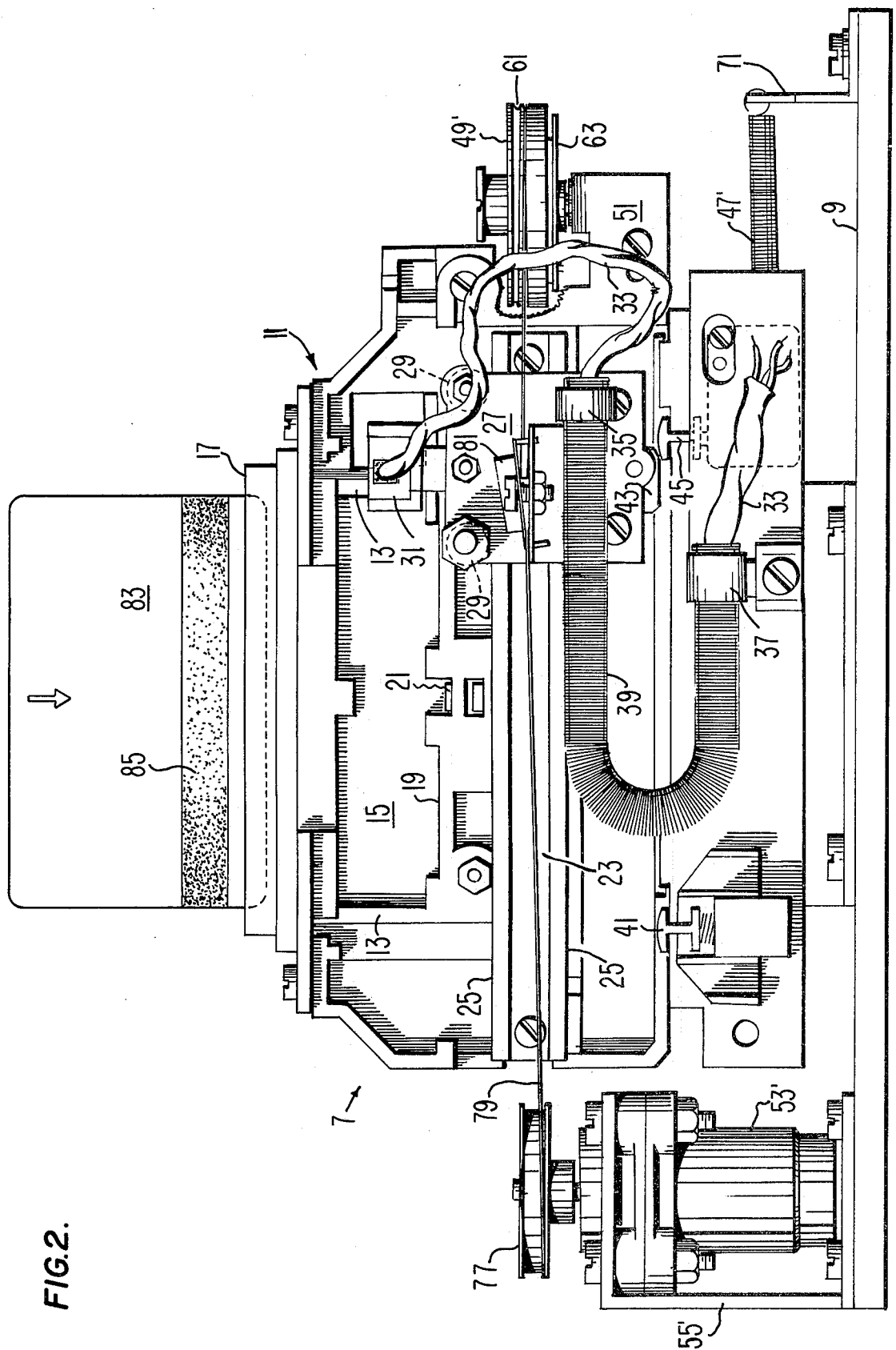
FIG. 2 is a front elevational view of a second embodiment of the invention wherein a rotary airpot is used and the drive spring is angularly connected to the frame structure and to the spiraling circumference of the rotatable member.

As illustrated in FIGS. 1, 2 and 3, the inventive magnetic stripe reader is comprised of a frame structure generally designated at 7 and including a base portion 9 and an upright card holding portion 11. The upright portion 11 is comprised of a pair of spaced apart edge guide members 13, a rear guide member 15, a rectilinear slot 17 for receiving a magnetic stripe credit card, and a bottom edge limit 19. The bottom edge limit 19 may be provided with a card present switch 21 effective for deactivating extraneous reading means when a credit card is not fully inserted into the slot 17 to abut against the bottom edge limit 19. The upright portion 11 is also provided with a horizontal guide member 23 equipped with upper and lower concave grooves or troughs 25. Translatably disposed relative to the guide member 23 and the concave troughs 25 thereof is a transversely activatable read head carrier 27 having a pair of upper rollers 29 and a centrally positioned lower roller (not shown) fixed thereto for ridably cooperating with the upper and lower concave grooves 25. Flexurally supported by the carrier 27 is a read head 31 which is biased into contact with the magnetic stripe of a credit card positioned in the upright card holding portion 11. An outboard extremity of an electric cable 33 is coupled to the read head 31, connected to the carrier 27 by a moving anchor 35, and connected to the base portion 9 by a stationary anchor 37, the electric cable disposed between the anchors 35 and 37 being contortionally shielded by a coil spring 39. The electric cable 33 is electrically couplable with the extraneous magnetic stripe reading means through an activating left end switch 41 and electrically decouplable therefrom by a deactivating right end switch 45. The end switches 41 and 45 are alternately activated by a switch actuator 43, disposed along the lower edge of the carrier 27, as the carrier 27 is transversely activated relative to the magnetic stripe of a card. Activation of the carrier 27 and read head 31 in a leftward direction, to thereby preset the credit card reader for a read cycle, may be accomplished either manually by means of a preset lever (not shown), or by a motor and cable arrangement (not shown), such cable being connected to the carrier 27 and windable around a pulley (not shown) fixed to the motor shaft, such presetting means not forming a part of the present invention.

As shown in FIGS. 1, 2 and 3 the inventive magnetic stripe reader includes an expansion spring 47 or 47', and a rotatable member 49 or 49', the expansion spring being connected at one end to the frame structure 7 and at the other end to a predetermined point along the circumference of the rotatable member 49 or 49'. The rotatable member 49 or 49' is rotatably mounted by means of a bracket 51 which is also attached to the upright portion 11, as hereinafter more fully described in connection with the embodiments of FIGS. 1 and 2. The inventive magnetic stripe reader is also provided with an airpot 53 or 53' that is supportably mounted by a bracket 55 or 55'. It will be apparent from the following description that the read head carrier 27 is rendered transversely activatable in a rightward read direction by the expansion spring 47 or 47', and that the normal spring-related fluctuations in the velocity of travel of the carrier are compensated for and counteracted by the action of the rotatable member 49 or 49', the airpot 53 or 53' at the same time providing a constant drag to the carrier movement such that the velocity of travel of the carrier 27 and read head 31 is rendered uniform and constant throughout each reading cycle.

In the embodiment depicted in FIG. 1, the expansion spring 47 is end anchored to the frame structure 7 by means of a support member 57, the other end of the spring 47 being connected to a predetermined point along the circumference of the rotatable member 49 by a flexible cable 59. The rotatable member 49, as illustrated in FIG. 1, is comprised of a concentric circumference 61 having a single peripheral groove, and an adjacent spiraling circumference 63. As illustrated in FIG. 4 relative to the rotatable member 49', the spiraling circumference 63 of the rotatable member 49 is provided with a maximum radius substantially equal to the radius of the concentric circumference 61, and with a minimum radius of substantially lesser dimension. The flexible cable 59 is connected, by any suitable means, to the spiraling circumference 63 at its point of maximum radius, and the concentric circumference 61 is connected to the carrier 27 by means of a flexible cable 65. The left end of the cable 65 is fixed to the carrier 27 by an anchor clip 67, and the right end of the cable 65 is connected to the concentric circumference 61 at a point adjacent the connection of the cable 59 to the spiraling circumference 63. An airpot 53 of linear configuration is mounted to the base portion 9 by means of a bracket 55, with the airpot 53 disposed in coplanar relationship relative to the carrier 27 and connected thereto by a rod 69.

In the embodiment depicted in FIGS. 2 and 3, the expansion spring 47', as best illustrated in FIG. 3, is end anchored to the base portion 9 by a support member 71 and angularly disposed around an idling pulley 73 mounted on a supporting bracket 75 that is fixed to the base portion 9. The opposite end of the expansion spring 47' is connected to the maximum radius of the spiraling circumference 63 of the rotatable member 49' by the flexible cable 59, in like manner to the connection of spring 47 and cable 59 to the spiraling circumference 63 of the rotatable member 49 of the FIG. 1 embodiment. The airpot 53' of the FIGS. 2 and 3 embodiment, which as previously indicated is of rotary configuration, is supportably mounted on the base portion 9 by means of a bracket 55', the rotary airpot 53' presenting a rotatable pulley 77 disposed in rectilinear spaced apart relationship with the concentric circumference 61 of the rotatable member 49'. The concentric circumference 61 of the rotatable member 49' is connected to the read head carrier 27 by an elongated flexible cable 79, the two extreme ends of the cable 79 being anchored to the carrier 27 by means of a double ended anchor clip 81, as best illustrated in FIG. 2. The flexible cable 79 windably cooperates with a pair of peripheral grooves forming a part of the concentric circumference 61 of the rotatable member 49', and is variably but consistently wound around approximately 360° of such concentric circumference in addition to being wound around 180° of the rotatable pulley 77 of the rotary airpot 53' disposed on the opposite side of the upright portion 11 from the rotatable member 49'. Anchoring of the flexible cable 79 to the concentric circumference 61 of the rotatable member 49' is accomplished by means of a diametric channel formed in the rotatable member 49' and interconnecting the pair of peripheral grooves forming a part of its concentric circumference 61, the cable 79 leading from the carrier 27 entering one end of this diametric channel and exiting from the other end thereof to thereafter span the linear distance between the rotatable member 49' and the rotatable pulley 77.

Critical to the effective operation of the inventive magnetic stripe reader is the rotatable member 49 or 49' having a concentric circumference 61 and a spiraling circumference 63, the concentric circumference 61 being cable connected to the carrier 27 and the spiraling circumference 63 being connected at its point of maximum radius to the expansion spring 47 or 47'. It will be apparent that in view of the cable connection between the read head carrier 27 and the concentric circumference 61 of the rotatable member 49 or 49', leftward activation of the read head carrier 27 to its read-start position will result in the clockwise rotation of the rotatable member 49 or 49', and, by reason of the cable connection between the expansion spring 47 or 47' and the spiraling circumference 63 of the rotatable member 49 or 49', in the expansion of the spring 47 or 47' as the cable 59 is progressively and windably gathered around the spiraling circumference 63, the progressive winding of the cable 59 around the spiraling circumference being characterized by an initial winding around the maximum radius of the spiraling circumference followed by the winding of the cable 59 around the gradually reducing radius thereof. Upon the initiation of a read cycle, the read head carrier 27 is released to the control of the fully extended expansion spring 47 or 47', whereupon the spring 47 or 47' proceeds to rotate the rotatable member 49 or 49' in a counterclockwise direction as the cable 59 is progressively unwound from the spiraling circumference 63, the progressive unwinding of the cable 59 from the spiraling circumference 63 being characterized by an initial unwinding from the minimum radius of the spiraling circumference 63 followed by the unwinding of the cable 59 from the gradually increasing radius thereof. This is to say that upon the release of the read head carrier 27 to the control of the fully extended expansion spring 47 or 47', the initial high and gradually decreasing pulling force of the spring 47 or 47' is counteracted by an initially small and gradually increasing radius of the spiraling circumference 63, to thereby provide a uniform and constant velocity of movement of the carrier 27 and read head 31 throughout each reading cycle.

OPERATION

Operation of the inventive magnetic stripe reader may be described with reference to FIGS. 1, 2 and 3. In the case of the FIG. 1 embodiment, a credit card 83 having a horizontally disposed magnetic stripe 85 would be fully inserted into the rectilinear slot 17 with the magnetic stripe disposed in exposed relationship with the read head 31, the fully inserted position of the card being defined by the bottom edge limit 19. Just prior to contact of the lower edge of the card 83 with the bottom edge limit 19, the card present switch 21 would be activated to enable a read cycle. Presetting of the read head carrier 27 to its leftmost read-start position would be accomplished either manually by a preset lever (not shown), or by depressing a "read initiate" switch (not shown) to thereby windably activate a motor driven cable (not shown) that would also be coupled to the carrier 27. As mentioned supra, presetting means have been omitted from the present disclosure since they form no part of the present invention. During the presetting leftward activation of the carrier 27, the flexurally suspended read head 31 would be idlingly translated relative to the magnetic stripe 85, by reason of the disabling of the extraneous reading means that was effectuated by contact of the switch actuator 43 with the deactivating right end switch 45 upon completion of the preceding read cycle. Upon arrival of the read head 31 and carrier 27 in their leftmost read-start positions, the switch actuator 43 contacts the activating left end switch 41 to thereby complete the enabling of the extraneous reading means. Means may be provided for latching the carrier 27 in the read-start position, or the carrier may be manually released to the control of the fully extended spring 47 immediately upon its arrival in such position. With the carrier 27 disposed in its leftmost read-start position and the expansion spring 47 disposed in its fully extended state, the flexible cable 59 would be wound around the spiraling circumference 63 of the rotatable member 49, and the flexible cable 65 would be substantially unwound from the concentric circumference 61 thereof. Upon release of the carrier 27 to the control of the extended spring 47, the spring 47 would proceed to contract, and to thereby rotate the rotatable member 49 in a counterclockwise direction as the flexible cable 59 is unwound from the spiraling circumference 63, and to partially wind the flexible cable 65 around the concentric circumference 61 thereof, the unwinding of the flexible cable 59 being characterized by an initial unwinding from the minimum radius of the spiraling circumference 63 and thereafter from the gradually increasing radius thereof, such that the decreasing velocity of the springs contraction is compensated for by the unwinding of the cable from the gradually increasing radius of the spiraling circumference 63. It is to be noted from FIG. 1 that the transverse activation of the carrier 27 in either a leftward presetting or rightward read direction is accompanied by a constant dragging force applied by the linear airpot 53 through the medium of the connecting rod 69.

In the case of the embodiment depicted in FIGS. 2 and 3, the leftward presetting activation of the carrier 27 results in the clockwise rotation of the rotatable member 49', as motivated by the flexible cable 79 connected thereto and to the concentric circumference 61 thereof, such clockwise rotation of the rotatable member 49' serving to maximally extend the expansion spring 47' as the connecting cable 59 is wound around the spiraling circumference 63 thereof. Upon release of the carrier 27 to the control of the fully extended expansion spring 47', the spring 47' would proceed to contract, and to thereby rotate the rotatable member 49' in a counterclockwise direction as the flexible cable 59 is unwound from the spiraling circumference 63, the unwinding of the cable 59 being characterized by an initial unwinding from the minimum radius of the spiraling circumference 63 and thereafter from the gradually increasing radius thereof, such that the decreasing velocity of the springs contraction is compensated for by the unwinding of the cable from the gradually increasing radius of the spiraling circumference 63. As previously noted, the flexible cable 79 is anchored at both ends to the carrier 27, anchored also to the concentric circumference 61 of the rotatable member 49' by means of the passage through the diametric channel formed therein, and disposed in cooperating relationship with the rotatable pulley 77 of a rotary airpot 53'. It will be apparent from this arrangement that the rotary airpot 53' will provide a constant dragging force to either the leftward presetting or rightward read movements of the read head carrier 27.

Although two separate embodiments of the inventive magnetic stripe reader have been described in considerable detail, it will be apparent that various modifications and changes in either the structure or configuration of the various elements may be made by those skilled in the art without departing from the true spirit and scope of the invention.

What is claimed is:

1. A device for reading information recorded on the magnetic stripe of a credit card, said device comprising:
   a. frame structure including a receiving slot for stationarily positioning a said credit card,
   b. a carrier translatably supported by said frame structure and movable as between the extremities of the magnetic stripe positioned on a said credit card,
   c. a transducing read head fixed to said carrier and electrically coupled to extraneous reading and interpreting means,
d. means for activating said carrier and said read head in a first direction,
e. an expansion spring connected at one end to said frame structure,
f. a first flexible cable coupled at at least one end to said carrier,
g. a second flexible cable coupled at one end to the other end of said expansion spring, and
h. rotatable means supportably and angularly interposed between said expansion spring and said carrier and having a concentric circumference and an adjacent spiraling circumference of varying radii ranging from a maximum radius substantially equal to the radius defining said concentric circumference to a minimum radius of predetermined lesser dimension, the other end of said second flexible cable being connected to said maximum radius of said spiraling circumference and said first flexible cable being coupled to said concentric circumference, whereby said rotatable means is rendered effective to counteract the normal variations in the pulling force applied by said expansion spring in the translation of said carrier and said read head in a second direction from a first position representing a read-start extremity of said magnetic stripe to a second position representing a read completed extremity of said stripe to thereby provide a uniform and constant velocity of travel of said read head between said first and said second positions.

2. The device defined in claim 1 and additionally comprising:
a. a linear airpot supported by said frame structure in spaced apart coplanar relationship with said carrier and including a piston disposed therewithin, and
b. a rod connected to said piston and to said carrier, whereby a constant drag is applied to the translatable movement of said carrier between its said first and second positions, said drag further contributing to said uniform and constant velocity of travel of said read head between said first and said second positions provided by said rotatable means in cooperation with said expansion spring.

3. The device defined in claim 1 and additionally comprising: a rotary airpot supported by said frame structure and presenting a rotatably mounted pulley around 180° of which said first flexible cable is wound, said first flexible cable also encompassing at least 180° of said concentric circumference of said rotatable means to which it is anchored and being connected at both ends to said carrier.

4. The device defined in claim 1 wherein said expansion spring in addition to being connected at one end to said frame structure and at the other end to said second flexible cable is partially wound around an idling pulley rotatably supported by said frame structure.

5. The device defined in claim 1 wherein during the reading of information recorded on said magnetic stripe of a credit card and the translatable movement of said carrier in said second direction from its said first position to its said second position the initial pulling force of the maximally extended expansion spring effectively rotates said rotatable means at a relatively slower rate as said second flexible cable unwindably cooperates with said minimum radius of said spiraling circumference thereof, and rotates said rotatable means at a relatively faster rate as the pulling force of said expansion spring decreases and as said second flexible cable unwindably cooperates with said spiraling circumference in the direction of its said maximum radius, the effect of such relatively variable rotating rates of said rotatable means in cooperation with the decreasing pulling force of the expansion spring serving to provide a uniform and constant speed of travel of said carrier between its said first and said second positions.

6. Means associated with an end anchored expansion spring when used for translatably activating a supported carrier as between a first and a second position and wherein the velocity of travel of the carrier therebetween is required to be constant and uniform, said means comprising:
a. a first flexible cable coupled at at least one end to said carrier,
b. a second flexible cable coupled to the free end of said expansion spring, and
c. rotatable means supportably and angularly interposed between said expansion spring and said carrier and having a concentric circumference and an adjacent spiraling circumference of varying radii ranging from a maximum radius substantially equal to the radius defining said concentric circumference to a minimum radius of predetermined lesser dimension, the other end of said second flexible cable being connected to said maximum radius of said spiraling circumference and said first flexible cable being coupled to said concentric circumference, whereby said rotatable means is rendered effective to counteract the normal variations in the pulling force applied by said expansion spring in the translation of said carrier from said first position to said second position to thereby provide a constant and uniform velocity of travel of said carrier therebetween.

7. Means defined in claim 6 wherein said end anchored expansion spring coupled to said second flexible cable is wound around a rotatably supported idling pulley.

8. Means defined in claim 6 wherein during the translatable activation of said carrier between said first and said second positions the initial pulling force of the maximally extended expansion spring effectively rotates said rotatable means at a relatively slower rate as said second flexible cable unwindably cooperates with said minimum radius of said spiraling circumference thereof and rotates said rotatable means at a relatively faster rate as the pulling force of said expansion spring decreases and as said second flexible cable unwindably cooperates with said spiraling circumference in the direction of its said maximum radius, the effect of such relatively variable rotating rates of said rotatable means in cooperation with the decreasing pulling force of the expansion spring serving to provide a uniform and constant speed of travel of said carrier between said first and said second positions.

9. Apparatus effective for receivably holding an object and for performing an operation relative to a linear surface thereof, said apparatus comprising:
a. frame structure including stationary holding means for receiving and holding a said object such that said linear surface thereof is exposed,
b. a carrier translatably supported by said frame structure,
c. an operating work member fixed to said carrier and rendered translatable thereby such that the full length of said linear surface may be brought into cooperating relationship therewith as said carrier is activated in a first direction, d. means for activating said carrier in a second direction, e. an expansion spring connected at one end to said frame structure, f. a first flexible cable coupled at at least one end to said carrier, g. a second flexible cable coupled at one end to the other end of said expansion spring, and h. rotatable means supportably and angularly interposed between said expansion spring and said carrier and having a concentric circumference and an adjacent spiraling circumference of varying radii ranging from a maximum radius substantially equal to the radius defining said concentric circumference to a minimum radius of predetermined lesser dimension, the other end of said second flexible cable being connected to said maximum radius of said spiraling circumference and said first flexible cable being coupled to said concentric circumference, whereby said rotatable means is rendered effective to counteract the normal variations in the pulling force applied by said expansion spring in the translation of said carrier and said work member in said first direction.

10. The apparatus defined in claim 9 and additionally comprising:

a. a linear airpot supported by said frame structure in spaced apart coplanar relationship with said carrier and including a piston disposed therewithin, and b. a rod connected to said piston and to said carrier, whereby a constant drag is supplied to the translatable movement of said carrier.

11. The apparatus defined in claim 9 and additionally comprising: a rotary airpot supported by said frame structure and presenting a rotatably mounted pulley around 180° of which said first flexible cable is wound, said first flexible cable also encompassing at least 180° of said concentric circumference of said rotatable means to which it is anchored and being connected at both ends to said carrier.

12. The apparatus defined in claim 9 wherein during the translatable movement of said carrier and said work member in said first direction the initial pulling force of the maximumally extended expansion spring effectively rotates said rotatable means at a relatively slower rate as said second flexible cable unwindably cooperates with said minimum radius of said spiraling circumference thereof, and rotates said rotatable means at a relatively faster rate as the pulling force of said expansion spring decreases and as said second flexible cable unwindably cooperates with said spiraling circumference in the direction of its said maximum radius, the effect of said relatively variable rotating rates of said rotatable means in cooperation with the decreasing pulling force of the expansion spring serving to provide a uniform and constant speed of travel of said carrier and said work member in said first direction.

* * * * *